March 25, 1969 S. R. MASSOLL ET AL 3,435,200
CORNERING LAMP ASSEMBLY

Filed Dec. 30, 1965

INVENTORS
Stanley R. Massoll &
Donald G. Roper
E. J. Biskup
ATTORNEY

INVENTORS
Stanley R. Massoll &
Donald G. Roper

United States Patent Office 3,435,200
Patented Mar. 25, 1969

3,435,200
CORNERING LAMP ASSEMBLY
Stanley R. Massoll, Detroit, and Donald G. Roper, Royal Oak, Mich., assignors to General Motors Corporation, Detroit, Mich., a corporation of Delaware
Filed Dec. 30, 1965, Ser. No. 517,639
Int. Cl. B60q 1/32
U.S. Cl. 240—8.2                            12 Claims

ABSTRACT OF THE DISCLOSURE

A vehicle cornering and backup lamp assembly having light directing louvers movable between a first position wherein light rays are directed laterally outwardly of the vehicle and to a second position wherein light rays are reflected toward the rear of the vehicle. A motor is provided for moving the louvers between the two positions and is operatively connected to the turn signal lever and the transmission selector lever.

---

This invention concerns a lamp assembly and more particularly a cornering lamp assembly which is mountable on the forward end of a vehicle for directing a steady beam of light to the side of the vehicle during nighttime turns.

The objects of the present invention are to provide an improved lamp assembly; to provide a cornering lamp assembly that will selectively direct light to the side and to the rear of a vehicle; to provide a cornering lamp assembly having light directing means movable between two positions and operated by the turn signal and transmission selector lever; and to provide adjustable reflecting means in a cornering lamp assembly for projecting a beam of light to the rear of the vehicle when the transmission selector lever is placed in the reverse position.

The above objects and others are accomplished in accordance with the invention by a lamp assembly which in its preferred form comprises a housing that supports a source of light and a lens. A plurality of louvers are mounted in the housing for movement between a first position wherein light is directed laterally outwardly of the vehicle and a second position wherein light is directed toward the rear of the vehicle. A motor is provided for moving the louvers between the two positions and is operatively connected to the turn signal lever and the transmission selector lever. The arrangement is such that when the transmission selector lever is placed in the reverse position the louvers are moved to the second position and light is reflected toward the rear of the vehicle. On the other hand, when the turn signal lever is actuated, the louvers are shifted to the first position and cause a beam of light to be directed to the side of the vehicle.

A more complete understanding of the present invention will be derived from the following detailed description when taken in conjunction with the drawings in which.

Figure 1:
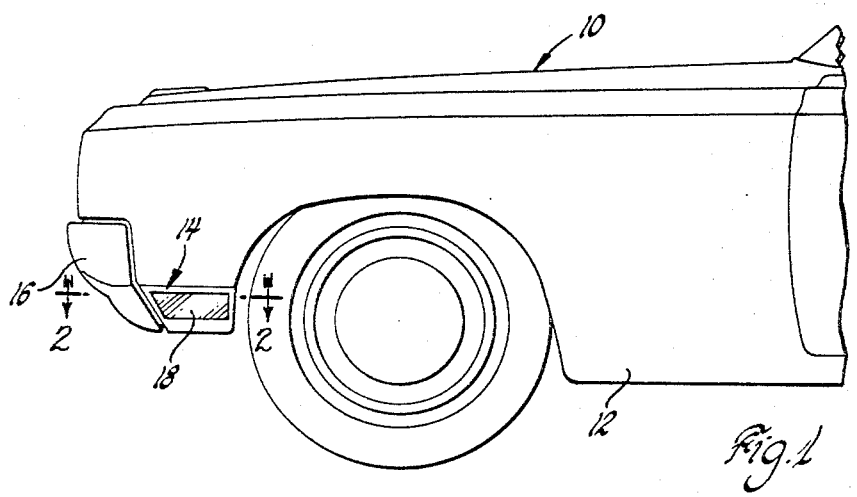
FIGURE 1 is an elevation view showing the front end of a vehicle incorporating a cornering lamp assembly made in accordance with the invention.

Referring now to the drawings and more particularly FIGURE 1 thereof, the front end of a vehicle 10 is shown having a fender 12, the forward end of which is provided with a cornering lamp assembly generally indicated by the numeral 14. The lamp assembly 14 is located slightly to the rear of a front bumper 16 and includes a lens 18 through which a steady beam of light may be projected to the side of the vehicle so as to help avoid possible hazards due to poorly lighted street corners, driveways, and other nighttime driving situations.

Figure 2:
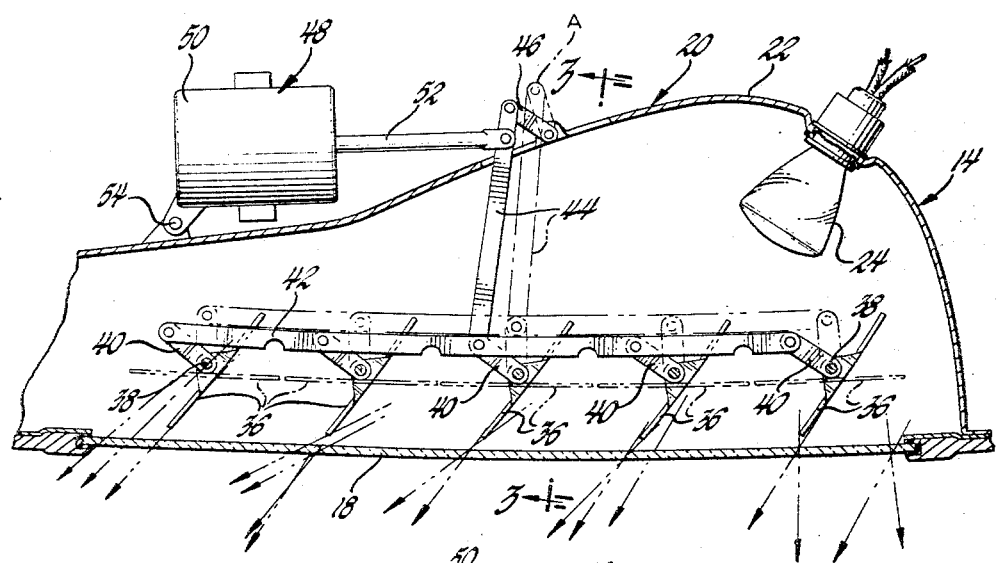
FIGURE 2 is an enlarged sectional view taken on line 2—2 of FIGURE 1 and illustrates the details of the cornering lamp assembly with the louvers thereof assuming a position for directing light rays to the side of the vehicle.

As seen in FIGURE 2, the cornering lamp assembly 14 comprises a housing 20 which is U-shaped in cross section and closed except for an opening provided in the front end thereof. The housing 20 has an end wall 22, a portion of which is formed in a parabolic shape and supports a lamp bulb 24 located generally at the focal point of the parabola. The lamp bulb 24 is suitably connected in the electrical system of the vehicle and adapted to be energized whenever the turn signal is actuated or the transmission lever is placed in a reverse position as will be explained hereinafter.

Figure 3:
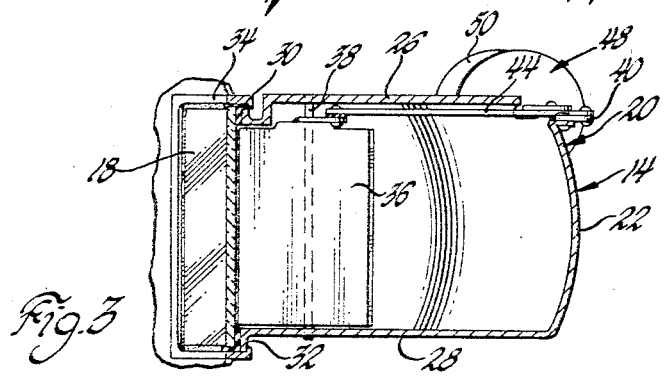
FIGURE 3 is a view taken on line 3—3 of FIGURE 2.

As seen in FIGURE 3, the wall 22 of the housing 20 is integrally formed with generally parallel upper and lower walls 26 and 28, the free ends of which respectively terminate with outwardly directed flanges 30 and 32 rigidly attached to a bezel member 34 which, in turn, supports the lens 18. In this form of the invention the lamp assembly 14 is rigidly attached to the lower front end of the fender 12 by screws or other suitable fasteners, not shown. It will be understood, however, that the lamp assembly 14 can be mounted in other portions of the fender 12 and can take different forms depending upon the shape of the fender or the location of the lamp assembly.

Within the housing 20 a plurality of identical louvers 36 are located, each of which is rigidly connected to a vertical shaft 38, the opposite ends of which are rotatably supported by the walls 26 and 28. An arm 40 is rigidly connected to each of the louvers 36 and, in turn, is pivotally connected to a drag link 42 which serves to interconnect all of the arms 40 and accordingly all of the louvers 36. An operating lever 44 has the inner end thereof pivotally connected to an intermediate portion of the drag link 42 while the outer end is pivotally connected to a crank member 46 which in turn is pivoted to the end wall 22 of the housing. Thus, as seen in FIGURE 2, when the crank member 46 assumes the position indicated by the letter A, the operating lever 44 is shifted toward the lamp bulb 24 and causes the louvers 36 to move from the full line position to the position indicated by the phantom lines wherein the louvers are located in a plane substantially parallel to the lens 18.

Figure 5:
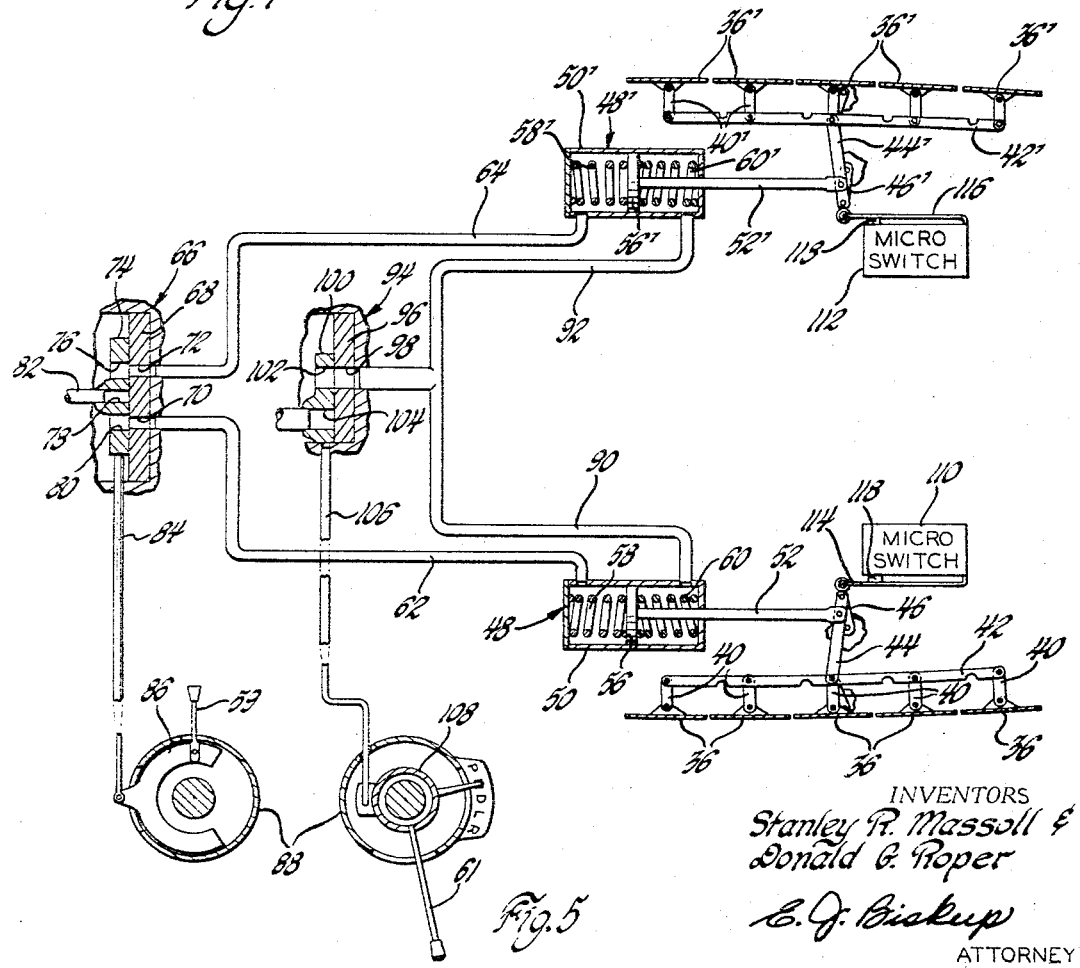
FIGURE 5 is a diagrammatic view illustrating a fluid circuit for operating the present invention when combined with the turn signal lever and the transmission selector lever.

For purposes of moving the louvers 36, a vacuum motor 48 is provided comprising a cylinder member 50 and a piston member having a rod portion 52 pivotally connected to the operating lever 44. The cylinder member 50 is pivotally connected to the housing 20 at a point 54 so as to permit the motor 48 to shift slightly outwardly and inwardly during the actuation of the operating lever 44. As best seen in FIGURE 5, the piston member has a piston head 56 which is normally maintained midway between the end walls of the cylinder member 50 by opposing coil springs 58 and 60 whereby the louvers 36 assume a coplanar position.

At this juncture, it will be noted that the front fender on the opposite side of the vehicle will also include a cornering lamp assembly which will be identically constructed as that shown in FIGURES 2 and 3. As seen in FIGURE 5, the louvers and associated parts of the other lamp assembly are identified by numerals corresponding to those which identify the parts in the lamp aassembly of FIGURE 2 but primed.

FIGURE 5 illustrates the operating circuit which together with the operating linkage to be described connects the motors associated with the lamp assemblies with a turn signal lever 59 and a transmission selector lever 61. It will be noted that the piston head end of the motors 48 and 48' are connected by conduits 62 and 64 to a valve arrangement generally indicated by the numeral 66. The valve arrangement 66 includes a stationary member 68 having ports 70 and 72 and a slidable valve member 74 having ports 76, 78, and 80. Port 78 is continuously connected with a conduit 82 which, in turn, is connected with the manifold vacuum of the vehicle. In addition, the valve member 74 is connected by a rod 84 to a shiftable C-shaped member 86 which is fixed with the turn signal lever 59. The arrangement is such that when the turn signal lever 59 is actuated by movement thereof in one direction or the other about the center of the steering column 88, the rod 84 is moved axially and port 78 of the valve member is connected with port 70 or 72 for purposes of energizing one of the motors 48 or 48'.

Similarly, the piston rod end of each of the motors is connected by conduits 90 and 92 to a valve arrangement generally indicated by the numeral 94. This valve arrangement also includes a stationary portion 96 having a port 98 and a movable valve member 100 which has a port 102 connected to atmosphere and a port 104 continuously connected with the manifold vacuum. The valve member 100 is adapted to be shiftable between two positions and is connected by a rod 106 to the transmission selector lever 61 through the jacket 108 rotatably supported in the steering column 88.

The operating levers 44 and 44' are operatively associated with microswitches 110 and 112 having pivotally supported switch arms 114 and 116, respectively. When the switch arm of each of the microswitches is in the position shown in FIGURE 5, a button 118 is depressed against the bias of a spring (not shown) and the electric circuit incorporating the associated lamp bulb is open so that the latter is deenergized. On the other hand, when the levers 44 or 44' are moved to either of the full line positions shown in FIGURE 2 or 4, the button 118 is released so as to close the lamp bulb electric circuit and energize the associated lamp assembly.

The operation of the invention, as illustrated in FIGURE 5, will now be described:

When the transmission selector lever 61 is in the neutral position N, or in any of the positions P, D, or L but not the R or reverse position, the valve member 100 connects the piston rod end of each of the motors 48, 48' with atmosphere by having port 98 register with port 102. Similarly, when the turn signal lever 59 is in the inactive or neutral position shown in FIGURE 5, both of the conduits 62 and 64 leading to the piston head ends of the motors 48 and 48' are vented or connected to atmosphere. Accordingly, under the influence of the opposed springs, both motors have the pistons thereof in the position shown in FIGURE 5 and the microswitches 110 and 112 are in the open position so that the lamp bulbs are not energized. Also, during this time the louvers of each cornering lamp assembly are located in a coplanar position with respect to the associated lens. Now assuming the driver moves the turn signal lever 59 in a counterclockwise direction to indicate a left turn, this action will cause the rod 84 and valve member 74 to be shifted axially to connect the vacuum port 78 with the port 70 and cause the piston head 56 to be drawn to the left as seen in FIGURE 5. As a result, operating lever 44 is moved to the position shown in FIGURE 2 thereby causing the louvers 36 to assume a position wherein the plane of each louver is located generally parallel to the longitudinal axis of the lamp bulb 24. Accordingly, the light rays being reflected from the parabolic reflector portion of the wall 22 are directed in directions indicated by the arrows. As should be apparent, when the turn signal lever 59 is moved counterclockwise to indicate a right turn, the vacuum line 82 is connected with port 72 resulting in energization of the motor 48' and rotation of the louvers to a similar position for directing a lateral beam of light to the side of the vehicle. In each case as the operating lever moves from the position indicated in FIGURE 5, the microswitch closes the circuit for energizing the associated lamp as described above.

Figure 4:
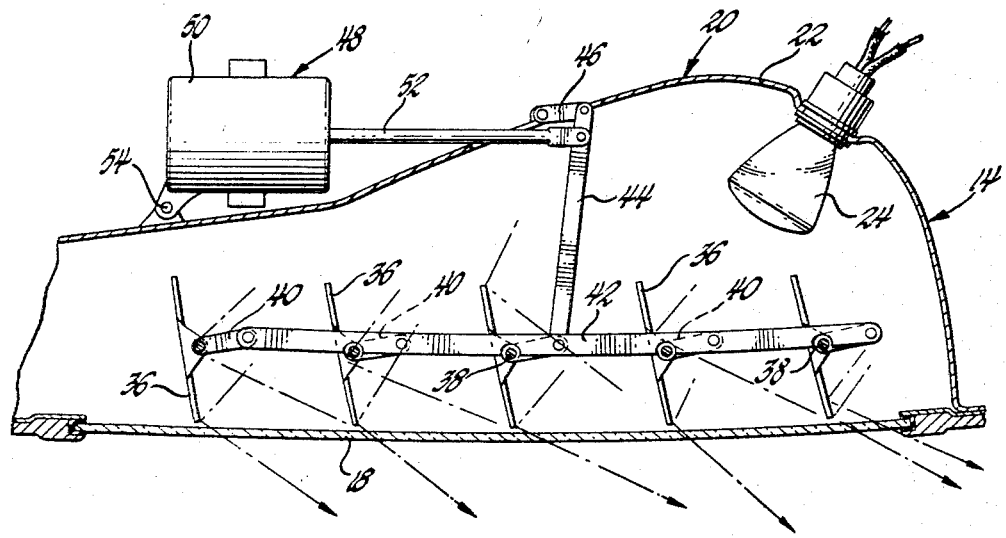
FIGURE 4 is a view similar to FIGURE 2 with the louvers assuming a position wherein light rays are directed to the rear of the vehicle.

When the transmission selector lever 61 is put in the R or reverse position, the port 104 will register with port 98 so that both conduits 90 and 92 are connected to the manifold vacuum. This causes the piston heads 56 and 56' to move to the right, as seen in FIGURE 5, thereby causing the louvers to assume a position, as seen in FIGURE 4, where the longitudinal axis of the lamp bulb 24 intersects the plane passing through each of the louvers. The inner surface of each louver is coated with a reflective material so as to cause the light rays to be reflected toward the rear of the vehicle as indicated by the arrows.

Although the invention is described in combination with a vacuum motor and operating circuit, it should be apparent that other forms of operating circuits and/or linkages can be utilized and still obtain the same type of movement of the louvers. For example, a solenoid can be substituted for the vacuum motor in each case with appropriate electrical connections being provided between the transmission selector lever and the turn signal lever for actuating the solenoid. Accordingly, it will be understood that the invention is illustrated only in its preferred form and that various modifications and changes can be made thereto without departing from the spirit of the invention. Hence, the inventors do not intend to be limited except by the scope of the claims which follow.

What is claimed is:

1. The combination with a vehicle having a transmission selector lever and a turn signal lever, a cornering and back-up lamp assembly adapted to be mounted on said vehicle along one side thereof, said lamp assembly comprising a housing supported by said vehicle and having a lens mounted therein, a source of light in said housing, light directing means supported in said housing between the source of light and lens, and means for moving the light directing means to a first position wherein light rays emanating from said source of light are directed laterally outwardly of the vehicle and to a second position wherein said light rays are reflected toward the rear of the vehicle, said means for moving the light directing means including a motor operatively connected with the transmission selector lever and the turn signal lever.

2. The lamp assembly of claim 1 wherein said motor is connected to said light directing means through a linkage supported by the housing.

3. The lamp assembly of claim 1 wherein first means are provided for energizing said motor to move the light directing means to said first position when the turn signal lever is activated to indicate a turn, and second means are provided for energizing said motor to move the light directing means to said second position when the transmission selector lever is put in a reverse position.

4. The lamp assembly of claim 1 wherein said light directing means comprises a plurality of louvers supported in said housing for pivotal movement about a vertical axis.

5. The lamp assembly of claim 2 wherein means pivotally support said motor on said housing.

6. The lamp assembly of claim 3 wherein said first means and second means include a source of vacuum for energizing the motor.

7. The lamp assembly of claim 3 wherein spring means are provided for maintaining said light directing means in a third position located between said first and second positions when the turn signal lever is inactive and the transmission selector lever is in a position other than reverse.

8. The lamp assembly of claim 4 wherein one side of each of said louvers has a reflecting surface for directing lights toward the rear of the vehicle when the louvers assume said second position.

9. The lamp assembly of claim 4 wherein each of said louvers is rigidly connected with one end of a link, the other end of each link pivotally connected to a drag link, and an operating lever connected between said motor and said drag link for pivoting said louvers between said first and second positions.

10. The lamp assembly of claim 6 wherein said first means and second means comprise valve means and conduits connecting said source of vacuum with said motor.

11. The lamp assembly of claim 7 wherein said spring means are incorporated with said motor.

12. The lamp assembly of claim 7 wherein said light directing means are located substantially parallel to the lens when in said third position.

References Cited

UNITED STATES PATENTS

| 1,591,754 | 7/1926 | Gates | 240—46.07 |
| 2,078,023 | 4/1937 | Roosa | 240—46.07 XR |
| 3,021,449 | 2/1962 | Kerr et al. | 240—8.22 XR |
| 3,039,020 | 6/1962 | Sargent | 240—8.22 XR |
| 3,079,529 | 2/1963 | Novinger | 240—41.1 XR |

FOREIGN PATENTS 475,092  10/1952  Italy.

NORTON ANSHER, *Primary Examiner.*

RICHARD M. SHEER, *Assistant Examiner.*

U.S. Cl. X.R.

240—46.07; 340—87